United States Patent [19]

Spörk et al.

[11] 4,072,580

[45] Feb. 7, 1978

[54] PROCESS FOR RECOVERING WATER-MISCIBLE SOLVENTS

[75] Inventors: Helmut Spörk, Altötting; Rudolf Strasser; Johann Waas, both of Burghausen, all of Germany

[73] Assignee: Wacker-Chemie GmbH, Munich, Germany

[21] Appl. No.: 652,009

[22] Filed: Jan. 26, 1976

[30] Foreign Application Priority Data

Jan. 29, 1975   Germany .............................. 2503619

[51] Int. Cl.$^2$ ......................... B01D 3/00; B01D 3/40; B01D 3/34

[52] U.S. Cl. ....................................... 203/47; 203/52; 203/70

[58] Field of Search ................................... 203/57–70, 203/52, 39, 47; 210/21

[56] References Cited

U.S. PATENT DOCUMENTS

| | | | |
|---|---|---|---|
| 2,085,287 | 6/1937 | Bailey | 203/52 |
| 2,470,206 | 5/1949 | Archibald | 203/52 |
| 3,433,788 | 3/1969 | Somekh et al. | 203/70 |
| 3,467,581 | 9/1969 | Privette et al. | 203/52 |
| 3,607,669 | 9/1971 | Jubin | 203/70 |

*Primary Examiner*—Thomas G. Wyse

[57] ABSTRACT

A water-miscible organic solvent is recovered from a mixture containing the solvent and water by adding an inert compound which is immiscible with the water and has a vapor pressure of no more than 5 mm Hg (abs.) at 100° C. to the mixture and thereafter distilling off the organic solvent.

7 Claims, No Drawings

PROCESS FOR RECOVERING WATER-MISCIBLE SOLVENTS

This invention relates to a method for recovering organic solvents and more particularily to a method for recovering water-miscible organic solvents.

The production of synthetic resins often results in the formation of waste water which contains water-miscible organic solvents having a boiling point below that of the water. Also, small amounts of synthetic resins are dissolved and/or dispersed in the water and the recovery of these resins by filtration or centrifugation can be achieved only at a great expense. Moreover, the waste water often contains hydrogen chloride in addition to the above mentioned compounds.

Therefore, it is an object of this invention to recover an organic solvent which is miscible with water. Another object of this invention is to recover an organic solvent which is substantially free of hydrogen chloride. Still another object of this invention is to provide a process for recovering a water-miscible organic solvent from water in which the organic solvent has a boiling point below that of the water. A further object of this invention is to provide a means for distilling off a water-miscible organic solvent from a mixture containing water, the water-miscible organic solvent, hydrogen chloride and synthetic resins without plugging the distillation column.

The foregoing objects and others which will become apparent from the following description are accomplished in accordance with this invention, generally speaking, by providing a process for recovering an organic solvent from a mixture containing water, the water-miscible organic solvent, synthetic resins and possibly hydrogen chloride which comprises adding an organic compound which is immiscible with water, inert with respect to the components of the mixture and has a vapor pressure which does not exceed about 5 mm Hg (abs.) at 100° C., to the mixture and thereafter distilling off the organic solvent.

The water-miscible organic solvent should have a boiling point at least about 1° C. below the boiling point of the water. These water-miscible organic solvents which are recovered in accordance with this invention are preferably ethanol and/or n-propanol. Examples of other water-miscible organic solvents which may be recovered by this process are acetone, isopropanol and tert.-butanol as well as dioxane, dimethylsulfoxide and N,N-dimethylformamide. The process of this invention may be used to recover a single organic solvent or mixtures of various organic solvents which are miscible with water.

The amount of water-miscible organic solvent having a boiling point below that of water, which may be present, can, for example, range from 1 to 90 percent by weight, and more preferably from about 5 to 75 percent by weight based on the total weight of the mixture, i.e., water, water-miscible organic solvent, synthetic resin and hydrogen chloride, if present.

The synthetic resins which are present in small amounts in the mixture from which a water-miscible organic solvent is to be recovered are of the type which are water-soluble and/or generally colloidally dispersable, but which are precipitated from the water by heating or by removing the organic solvent. Examples of such synthetic resins are hydrolysates of organosilanes containing hydrolyzable groups or hydrolyzable atoms such as alkylsilanes, mixtures of alkylsilanes and alkenylsilanes, and/or aryl silanes having an average of 0.9 to 1.9 Si-linked hydrocarbon radicals for each Si atom, with the silicon valences which are not saturated with hydrocarbon radicals being saturated with halogen atoms such as chlorine atoms, and/or alkoxy groups having from 2 to 4 carbon atoms. Generally the synthetic resins are present in the mixture in trace amounts such as from 0.0001 percent to about 5 percent by weight based on the total weight of the water, water-miscible organic solvent, synthetic resins and hydrogen chloride, if present. This process is equally applicable to mixtures of synthetic resins.

In addition to the water-miscible organic solvent having a boiling point below that of the water, synthetic resins and hydrogen chloride, the mixture may contain other organic solvents having boiling points below about 120° C. at 760 mm Hg (abs.). Examples of such other organic solvents are methylene chloride, benzene, toluene and diisopropylether. The mixture may contain one or more organic solvents having a boiling point up to about 120° C. at 760 mm Hg (abs.). The organic solvent having a boiling point up to about 120° C. at 760 mm Hg (abs.) may be miscible or immiscible with the other components of the mixture.

The inert organic compound which hereinafter is referred to as a "supplemental liquid" is immiscible with water and has a vapor pressure which does not exceed about 5 mm Hg (abs.) at 100° C. In addition, the supplemental liquid is a liquid at room temperature and inert with respect to the other components of the mixture from which the water-miscible organic solvent is to be recovered in accordance with the process of this invention.

When used in connection with the supplemental liquid, the term "inert" is intended to mean that the supplemental liquid must remain fluid under the conditions required for the distillation of the water-miscible organic solvent and that the supplemental liquid must not generate any dissociation products having a vapor pressure of more than 5 mm Hg (abs.) at 100° C.

It is preferred that the supplemental liquid be immiscible with hydrogen chloride and that it does not dissolve the synthetic resin which precipitates during the distillation. Examples of such supplemental liquids are hydrocarbons which are liquid at room temperature and which have a vapor pressure of no more than 5 mm Hg (abs.) at 100° C. Examples of suitable hydrocarbons are aliphatic or cycloaliphatic hydrocarbons having at least 10 carbon atoms such as paraffin oil, i.e., saturated aliphatic hydrocarbons having boiling points of at least 360° C. at 760 mm Hg (abs.), as well as tetrahydronaphthalene, decahydronaphthalene, turpentine and dipentene; alcohols which are liquid at room temperature and have a vapor pressure of no more than about 5 mm Hg (abs.) at 100° C. such as 2-ethylhexanol, isooctanol, decanol, stearyl alcohol and tetrahydronaphthol. Examples of other supplemental liquids which are liquid at room temperature and have a vapor pressure of no more than 5 mm Hg (abs.) at 100° C. are tetrahydrocarbon silanes such as dimethyldiphenylsilane, trimethylbenzylsilane, tetra-n-propylsilane and tetraisoamylsilane and ethers such as diphenylether. Paraffin oil is particularly preferred because it is readily available.

A single supplemental liquid may be employed or mixtures of various types of supplemental liquids can be employed in the process of this invention.

It is preferred that the supplemental liquid be employed in an amount of from 3 to about 50 percent by volume based on the total volume of the mixture which includes the water-miscible organic solvent, water, synthetic resin and hydrogen chloride, if present.

If the mixture from which the water-miscible organic solvent is to be recovered in accordance with the process of this invention contains hydrogen chloride in an amount of more than 20 percent by weight based on the total weight of water and hydrogen chloride, then additional water should be added to the distillation column. Preferably the amount of water added should be sufficient to provide that no more than 20 percent by weight of hydrogen chloride based on the total weight of the water and hydrogen chloride is present in the distillation column. However, when the hydrogen chloride content is below about 20 percent by weight based on the total weight of water and hydrogen chloride, then no additional water needs to be added to the distillation column.

Distillation can be carried out by any conventional means and at pressures and temperatures which are customarily employed for distilling off water-miscible organic solvents which are mixed with water and whose boiling point is below that of the water. The pressure is generally that of the surrounding atmosphere, i.e., 760 mm Hg (abs.) or approximately 760 mm Hg (abs.). However, when desired, higher or lower pressures may be employed.

The distillate recovered from the distillation consists essentially of the water-miscible organic solvent and possibly the other solvent which has a boiling point up to about 120° C. at 760 mm Hg (abs.). However, the distillate is free or substantially free of hydrogen chloride.

While the distillate consists essentially of the water-miscible organic solvent, the distillation residue consists essentially of the supplemental liquid in which the synthetic resin is present in solution or in suspension, as well as water and possibly hydrogen chloride. The supplemental liquid may be separated from the aqueous phase and if the synthetic resin is suspended in the supplemental liquid, it can be readily removed from the latter, for example, by filtration. After the synthetic resin has been removed from the supplemental liquid, the supplemental liquid can again be used in the process of this invention. The aqueous phase of the distillation residue is free of or substantially free of organic components and after neutralization, if necessary, may be discharged into the environment.

The process of this invention can be carried out batchwise, semi-continuously or continuously. It is preferred that the process be carried out continuously, since in a continuous process a relatively small distillation column will nevertheless provide a large yield. Since the distillate is free of or substantially free of hydrogen chloride, the condensers and the conduits which are connected to the condensers as well as the installation's other devices can be constructed of readily available materials which need not be resistant to hydrochloric acid.

The process of this invention may be used in recovering water-miscible organic solvents from waste waters resulting from the production of organopolysiloxane resins, i.e., from mixtures which contain solvents, water and small amounts of the aforementioned hydrolysates of organosilanes and hydrogen chloride, if present. Also, this process can of course be employed whenever it is desired to separate a water-miscible organic solvent from mixtures containing water and water-miscible organic solvents.

An embodiment of this invention is further illustrated in the following example.

EXAMPLE

A fractioning column having an inside diameter of 150 mm, which is heated by means of a circulating evaporator, is employed as a distillation device. The column consists of a 1 meter long separating column having 5 bubble-cap trays and a booster element having 4 compartments each 1 meter long, so-called "shots", which are filled with fillers. Approximately 30.6 kg per hour of waste water obtained from the production of organopolysiloxane resins is introduced into the fractioning column together with 15 kg of additional water and 8 kg of paraffin oil. The waste water added to the fractioning column contains the following ingredients:
  30 percent by weight ethanol
  50 percent by weight water
  19 percent by weight hydrogen chloride
  1 percent by weight toluene and
  Traces of hydrolysates and methylchlorosilanes A steam consumption of 28.3 kg/hr and a circulation ratio of 2 yields 10.18 kg/hour of distillate. Analysis reveals that the distillate contains less than 1 mg/liter of hydrogen chloride, 10 percent by weight of water and the balance being toluene and ethanol. The distillate thus recovered can be recycled in the production of organopolysiloxane resins.

The distillation residue consists of paraffin oil having the organopolysiloxane resin suspended therein and 16.3 percent by weight hydrogen chloride. The paraffin oil, which is the lighter phase, is removed from the residue in a separator. The organopolysiloxane resin is removed by filtration and the paraffin oil recycled to the fractionation column. The hydrogen chloride is substantially free of organic components.

It is not intended to limit the invention solely to the Example described above, but to include all the variations and modifications falling within the spirit and scope of the appended claims.

What is claimed is:

1. A process for removing organopolysiloxane resins from a mixture containing water, a water-miscible organic solvent having a boiling point below that of water and an organopolysiloxane resin which comprises adding an inert organic compound which is a non-solvent for the organopolysiloxane resins and is immiscible with water and has a vapor pressure up to 5 mm Hg (abs.) at 100° C. to the mixture, distilling off the water-miscible organic solvent and thereafter separating the organopolysiloxane resins from the organic compound.

2. The process of claim 1 wherein the mixture contains up to 20 percent by weight of hydrogen chloride based on the total weight of hydrogen chloride and water.

3. The process of claim 2 wherein the inert organic compound is immiscible with the hydrogen chloride.

4. The process of claim 1 wherein the mixture which contains hydrogen chloride in an amount greater than 20 percent by weight based on the weight of hydrogen chloride and the mixture is diluted with water to reduce the concentration of hydrogen chloride below 20 percent by weight based on the total weight of water and hydrogen chloride.

5. The process of claim 1 wherein the inert organic compound is paraffin oil.

6. The process of claim 1 wherein the inert compound is employed in an amount of from 3 to 50 percent by volume based on the total volume of the mixture containing water, water-miscible organic solvent and organopolysiloxane resins.

7. The process of claim 1 wherein the inert compound is employed in an amount of from 3 to 50 percent by volume based on the total volume of the mixture containing water, water-miscible organic solvent, and organopolysiloxane resins and hydrogen chloride.

* * * * *